United States Patent
Epshteyn

(10) Patent No.: US 6,386,060 B1
(45) Date of Patent: *May 14, 2002

(54) GEARING WITH DUPLEX FLOATING TOOTHED PORTIONS

(76) Inventor: Iosif Epshteyn, 4550 N. Cearendon, #2106N, Chicago, IL (US) 60640

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,399

(22) Filed: Aug. 27, 1999

Related U.S. Application Data

(60) Provisional application No. 60/107,047, filed on Nov. 4, 1998.

(51) Int. Cl.[7] .............................................. F16H 55/18
(52) U.S. Cl. ........................ 74/440; 74/409; 74/410
(58) Field of Search .................... 74/440, 439, 409, 74/416, 417, 410, 445, 450

(56) References Cited

U.S. PATENT DOCUMENTS

| | | | |
|---|---|---|---|
| 1,183,328 A | * 5/1916 | Terry | 74/409 |
| 3,102,433 A | 9/1963 | Stoeckich | 74/410 |
| 4,036,074 A | * 7/1977 | Bodnar | 74/409 |
| 4,612,816 A | 9/1986 | Chalik | 74/401 |
| 4,719,813 A | * 1/1988 | Chalik | 74/409 |
| 5,743,145 A | 4/1998 | Terada | 74/409 |
| 5,787,766 A | 8/1998 | Blach | 74/665 |
| 5,802,920 A | 9/1998 | Becker | 74/439 |

* cited by examiner

*Primary Examiner*—David Fenstermacher
(74) *Attorney, Agent, or Firm*—Patents+TMS, P.C.

(57) ABSTRACT

A gearing with duplex floating toothed portions for transmission between either two parallel shafts or two intersecting shafts comprising two meshing gears(12) and (14). Gear (14) having coaxially disposed toothed portions (16) and (18) interacting with component (20) by spiral joints (22) and (24) different characteristics and an arrangement limitative divided spiral motions of toothed portions (16) and (18) relatively component (20) by parting plane "A" and arresting device (26). Both toothed portions (16) and (18) of gear (14) and meshing gear (12) have mating teeth whereby both toothed portions (16) and (18) are coupled positively with component (20). Even distribution of applied force between toothed portions (16) and (18) or elimination of the free angular displacement of the gear (12) and (14) with respect to each other within backlash are provided by choice of characteristics of spiral joints (22) and (24).

7 Claims, 7 Drawing Sheets

GEARING WITH DUPLEX FLOATING TOOTHED PORTIONS

This application claims the benefit of U.S. Provisional Application Ser. No.: 60/107,047, filed Nov. 4, 1998.

BACKGROUND

1. Field of Invention

This invention relates to a gearing with a split gear having two toothed portions.

2. Description of Prior Art

In symmetrical double helical or herringbone type gears, tooth meshing errors cause uneven distribution of applied loads between two toothed portions of the symmetrical double helical or herringbone type gear.

Accordingly, efforts have been made when designing double toothed helical gears to eliminate or at least to reduce tooth meshing errors. For example, U.S. Pat. No. 3,102,433 to Stoeckict discloses a gear mechanism wherein one gear is axially fixed. The other gear moves axially along its shaft or axially together with its shaft. Each gear is comprised of two toothed portions. The teeth of the first toothed portion have an inclination angle in one direction and a normal pressure angle. The teeth of the second toothed portion have an inclination angle in the opposite direction and have a normal pressure angle. The inclination angle of the teeth of the second toothed portion is greater than the inclination angle of the first toothed portion. The normal pressure angle of the second toothed portion is smaller than the normal pressure angle of the first toothed portion. A substantially greater portion of an applied load is taken-up permanently by the toothed portion having the lesser inclination angle. The gearing is less sensitive to the variations of load-distribution due to the mesh errors than is a gearing of the symmetrical herringbone type.

Symmetrical herringbone type gearings have toothed portions which are fixed to each other, however, symmetrical herringbone type gearings exhibit the following disadvantages:

(a) Effective face width of the symmetrical herringbone type gearings is the same as a typical gearing. For increasing loading ability there is a need to increase a center distance. The weight of the gear assembly will increase too.

(b) The technological process for manufacture of the teeth of the gears is expensive.

(c) Presence of a dynamic load on the gear teeth, particularly for high-speed gearing.

Further, for high-speed gearings unavoidable inaccuracies in the tooth mesh due to the tolerance, as well as errors in manufacturing and assembly, lead to high-frequency periodic accelerations of the driven gear. These accelerations result in the imposition of acceleration forces on the meshing teeth. Due to the presence of backlash between non-working tooth flanks, the acceleration of the driven gear leads also to separation of the working teeth followed by a reengagement. As a result, impact load is imposed on the gear teeth. This phenomenon, known as free impact or hammering, results in high dynamic loading on the gear teeth with attendant noise generation and vibration occurring.

An example of anti-backlash gearings are presented in U.S. Pat. No. 4,612,816 to Chalik. Each gear has coaxially disposed first and second toothed portions. The teeth of the first portion have a first inclination angle. The teeth of the second toothed portion have a second inclination angle different from the first inclination angle. One of the meshing gears is fixed to its shaft, while the other is mounted so as to be axially displaceable with respect to the fixed gear. Preloading means urge the floating gear against the fixed gear. The teeth of the first toothed portion of the floating gear mesh with the teeth of the first toothed portion of the fixed gear. The teeth of the second toothed portions of the floating gear mesh with the teeth of the second toothed portion of the floating gear along the opposite tooth flanks with respect to each other.

The gear assembly taught by Chalik exhibits the following disadvantages:

(a) Preloading means have a large, complex, and complex adjustment.

(b) The gear assembly can be used only in non-reversible one stage gear set.

(c) Manufacturing of the gear assembly is expensive.

OBJECTS AND ADVANTAGES

Basic objects and advantages of the present invention may comprise the following:

(a) to provide even distribution of an applied load between the floating toothed portions for increasing the loading ability of the gearing without increasing the center distance. The weight of the gear assembly will increase insignificantly. Service life will stay the same.

(b) to provide smooth working of the gearing.

(c) to eliminate dynamic load on the gear teeth for high-speed reversible gearing without the use of toothed portions with different helix angles and the means for preloading.

The objects and advantages may enable the use of the invention for gearing of any classification and in a reversible multi-stage gear assembly.

Additional features and advantages of the present invention are described in, and will be apparent from, the detailed description of the presently preferred embodiments and from the drawings.

DRAWING FIGURES

The present invention will be more particularly described in the following discussion of the preferred embodiments thereof with reference to the accompanying drawings.

SUMMARY

In accordance with the present invention, a gearing with a duplex floating toothed portions comprises a plurality of meshing gears. One of the meshing gears has coaxially disposed two floating toothed portions interacting with a spiral joint and an arrangement limitative divided spiral motions of toothed portions relatively component.

DESCRIPTION OF THE PRESENTLY PREFERRED EMBODIMENTS

Figure 1:
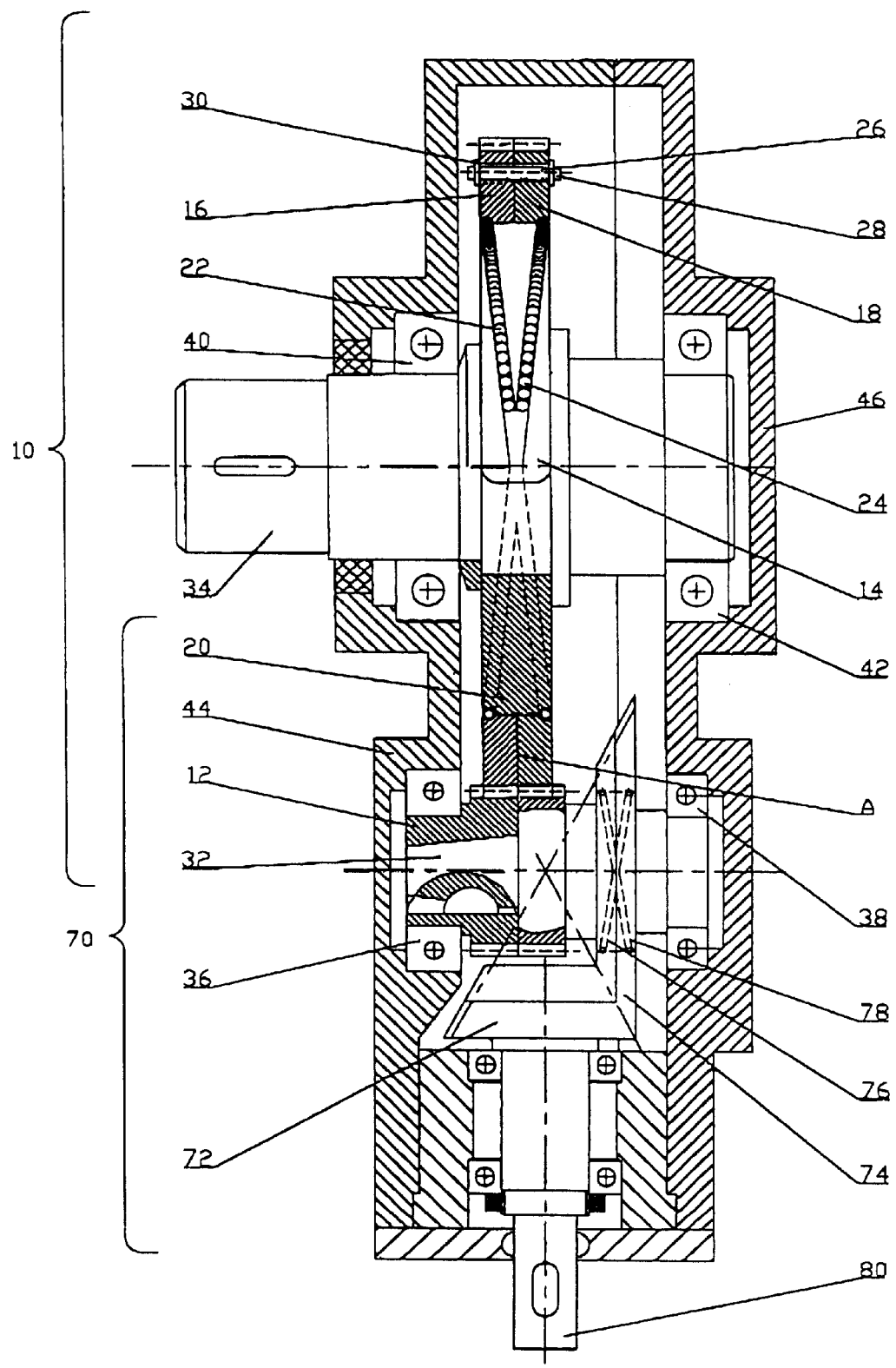
FIG. 1 is an elevational view, partly in section, showing a gear housing incorporating the inventive concept hereof for transmission between parallel and intersection shafts.
Figure 2:
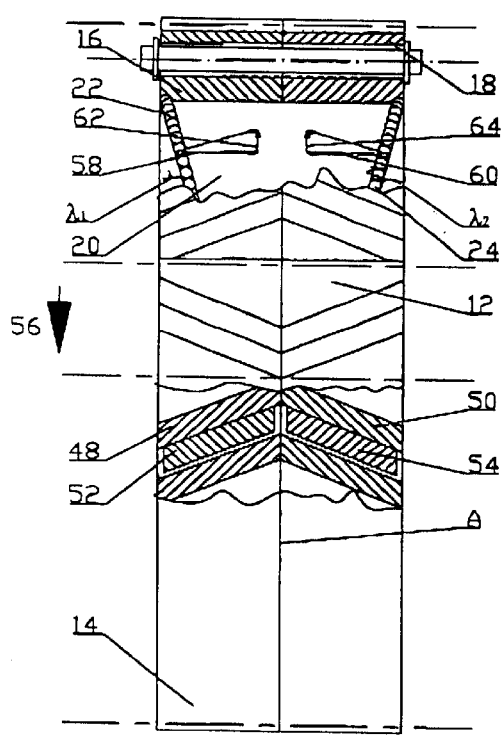
FIGS. 2 and 2A are the diagrammatic illustrations of the engagement of the teeth and of the contact in the spiral joints of the gear assembly of FIG. 1. The spiral joints have the opposite directions.
Figure 2A:
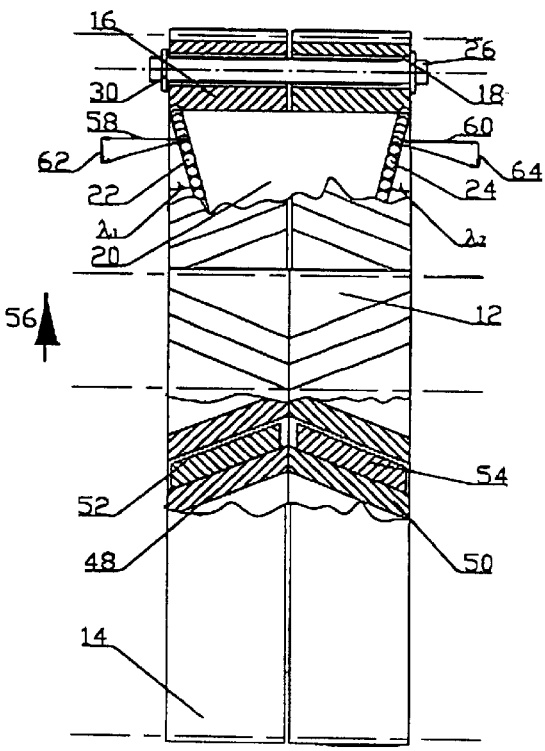
Figure 3:
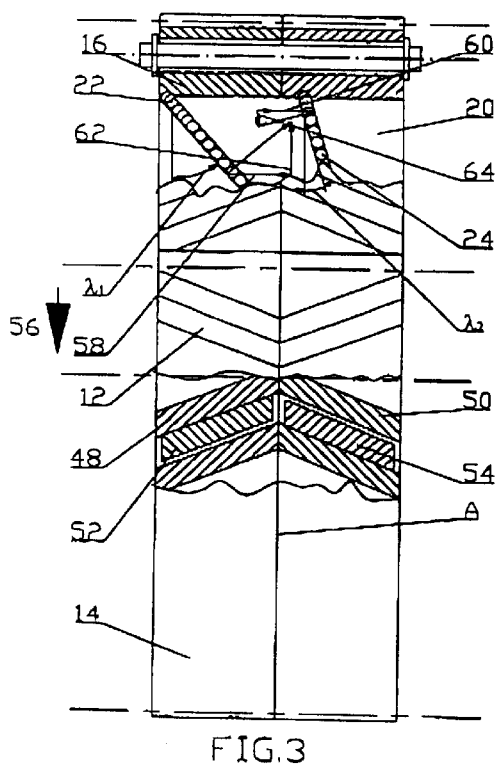
FIGS. 3 and 3A are the diagrammatic illustrations of the engagement of the teeth along working opposite flanks and of the contact in the spiral joints of the gear assembly of FIG. 1. The spiral joints have the same direction but different lead angles.
Figure 3A:
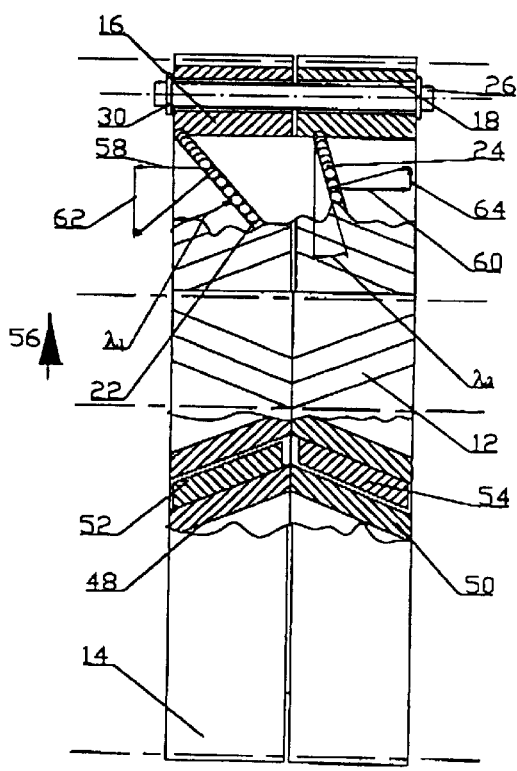
Figure 4:
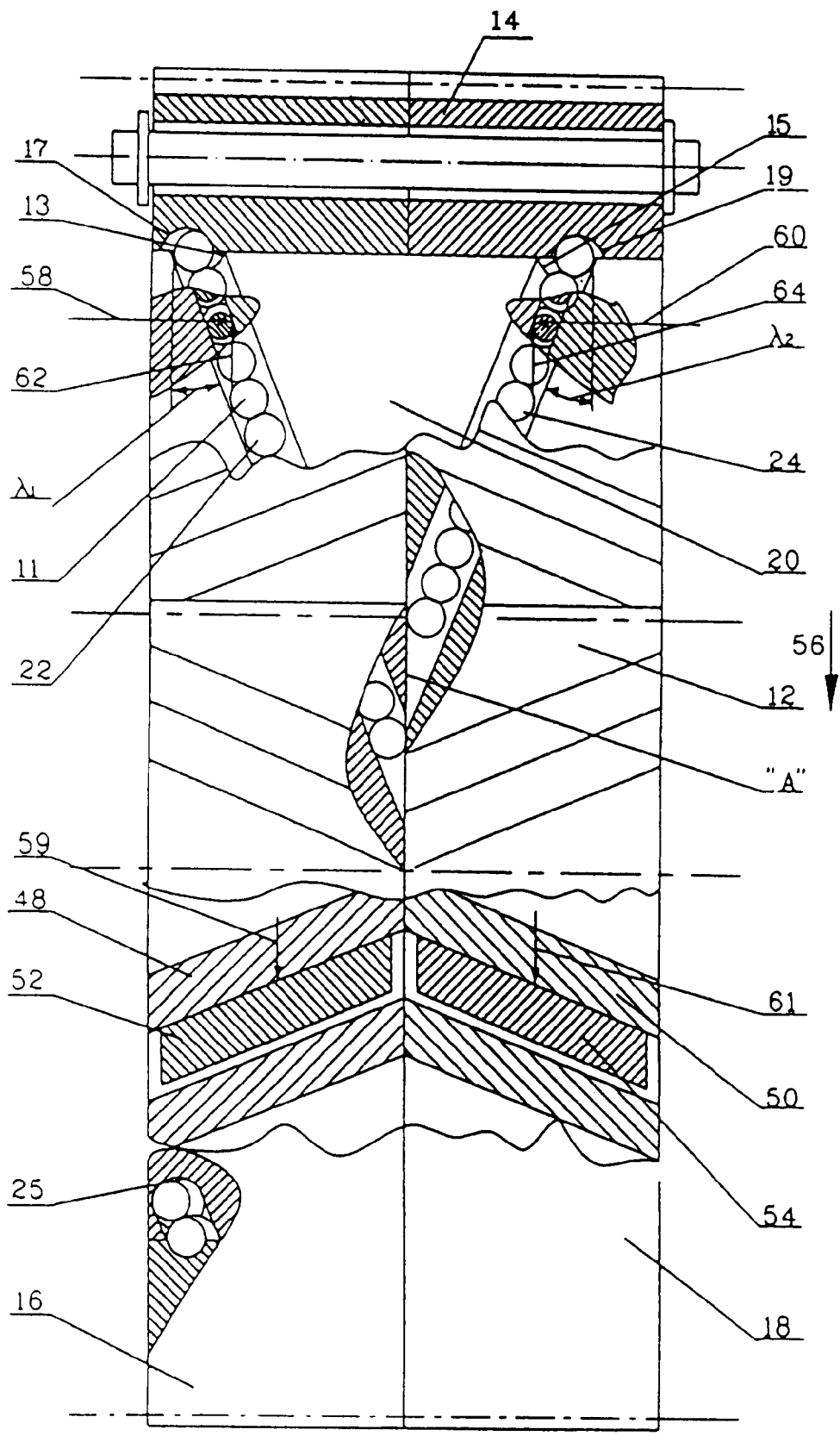
FIGS. 4 and 4A are the diagrammatic illustrations of the engagement of the teeth and of the contact in the spiral joints of the gear assembly 10 of FIG. 1. The spiral joints have the opposite directions.
Figure 4A:
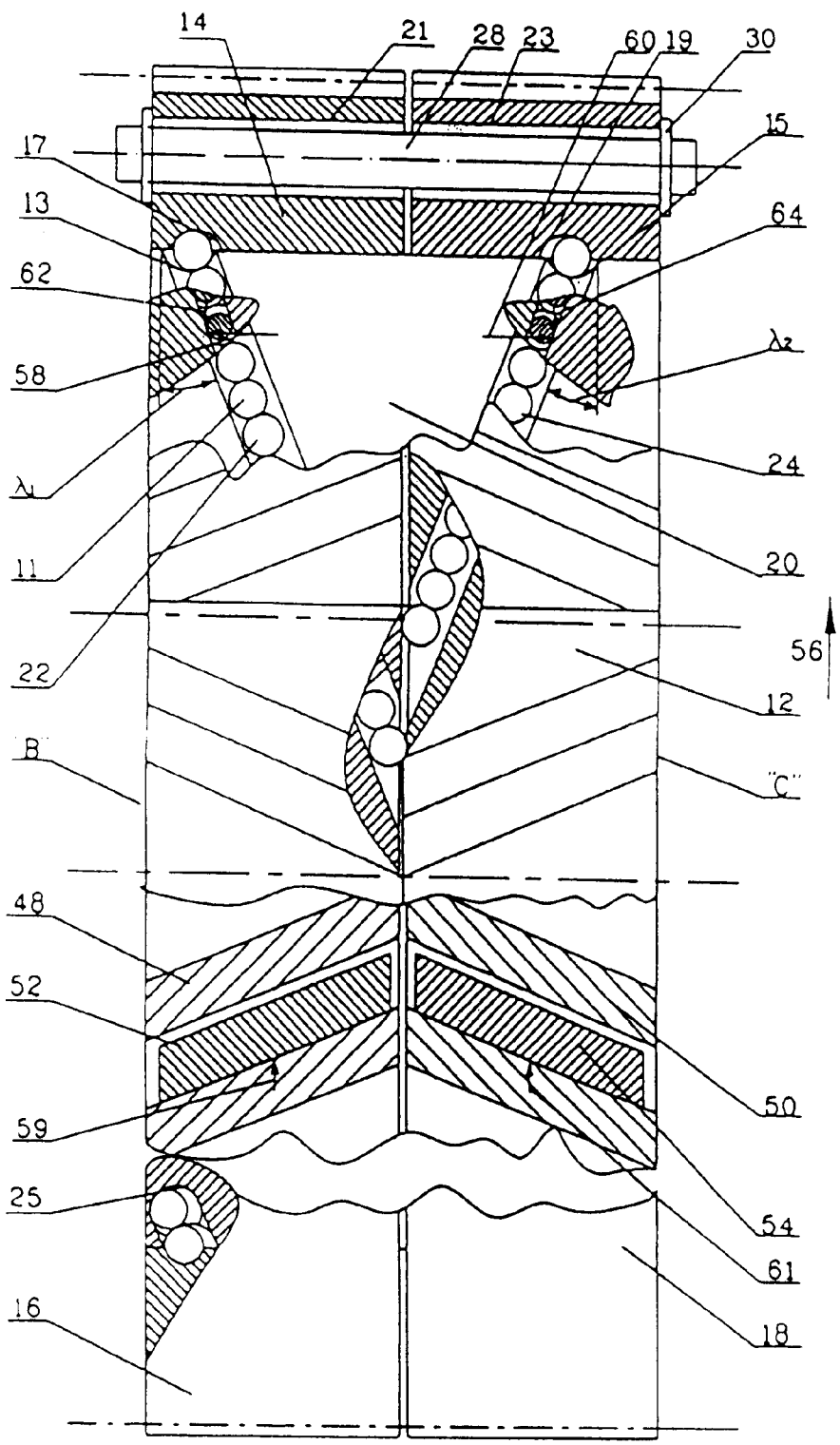

FIG. 1 shows the elevational view of a gear assembly 10 for the transmission between drive shaft 32 and driven shaft 34. Gear assembly 10 comprises meshing herringbone gear 12 and gear 14. Drive shaft 32 and driven shaft 34 are each rotatably supported along parallel axes by bearings 36 and 38 and 40 and 42, respectively. The drive shaft 32 and driven shaft 34 are each mounted in a housing 44 and cover 46. The gear 12 and the gear 14 may be formed either as spurs or as helices with teeth 48, 50, 52 and 54 (see FIGS. 4b and 4c) in a staggered arrangement or may be formed in a non-staggered relationship as shown in FIG. 4A. Gear 12 is mounted fixedly to a drive shaft 32 by means well known in the art. Gear 12 may be formed of two toothed portions cut on separate blanks or gear 12 may be cut on single blank. Gear 14 may be formed of hub 20 and coaxially disposed toothed portions 16 and 18 contacting along parting plane "A". Hub 20 is mounted to the driven shaft 34 by means well known in the art. The toothed portions 16 and 18 of gear 14 may be mounted to a typical or special hub 20 and may interact with the hub 20 by spiral joints 22 and 24. The spiral joints 22 and 24 maybe formed, for example, by right-hand and left-hand ball double thread joints. As illustrated in FIGS. 4 and 4A, values of lead angles $\lambda_1$ and $\lambda_2$ of the spiral joints 22 and 24 may be any selected angle but they have to provide for the overhauling spiral joints 22 and 24. Hub 20 is mounted to its driven shaft 34 by means well known in the art.

Gear 14 has an arrangement which prevents the separate spiral motions of toothed portions 16 and 18. The arrangement may be a different design, for example, in view of arresting device 26. Arresting device 26 consists of pins 28 and retaining rings 30. As illustrated in FIGS. 4A and 5A pins 28 are disposed with clearance in holes 21 and 23 of toothed portions 16 and 18. Retaining rings 30 are disposed on pins 28 contacting with toothed portions along surfaces "B" and "C". A mounting of pins 28 provides the spiral motions of toothed portions 16 and 18 relative to hub 20.

As illustrated in FIGS. 4 and 4A the directions of the helix angles of teeth 52 and 54 and of spiral joints 22 and 24 must be opposite for each toothed portions 16 and 18, respectively in order to provide the spiral motions of the toothed portions 16 and 18 relative to hub 20.

Figure 5:
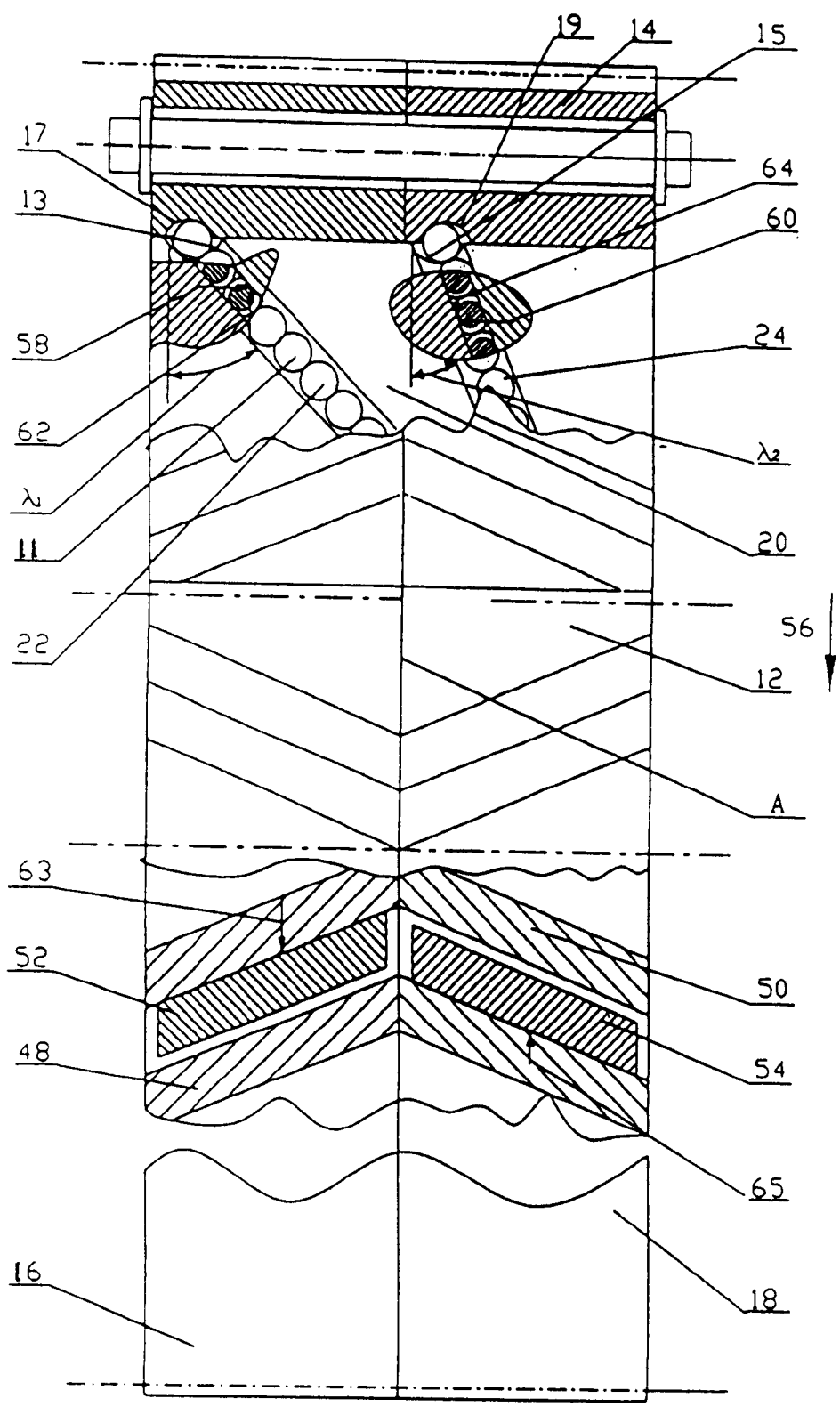
FIGS. 5 and 5A are the diagrammatic illustrations of the engagement of the teeth along working opposite flanks and of the contact in the spiral joints of the gear assembly 10 of FIG. 1. The spiral have the same direction but different lead angles.
Figure 5A:
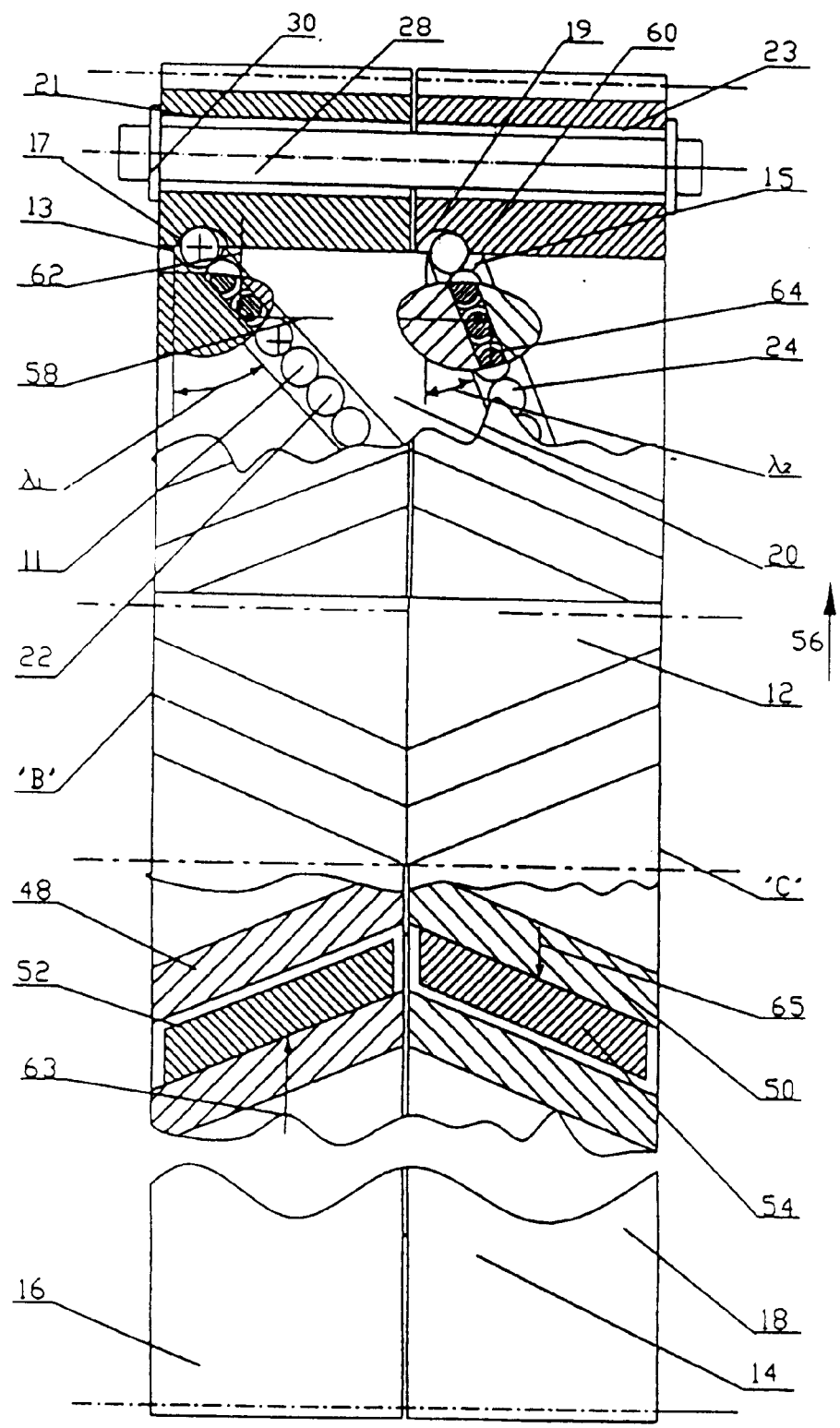

As illustrated in FIG. 5 and 5A, toothed portions 16 and 18 are mounted to hub 20 by the right-hand ball double thread joints of spiral joints 22 and 24. The right-hand ball double thread joints have the same direction. The spiral joint 22 has a lead angle of $\lambda_1$. The spiral joint 24 has a lead angle of $\lambda_2$. Values of lead angles $\lambda_1$ and $\lambda_2$ can be any selected but they have to provide the overhauling spiral joints 22 and 24. For two predetermined spiral joints 22 and 24 of the same directions it is necessary that $\lambda_1 > \lambda_2$. Therefore the axial displacement per revolution of toothed portion 16 is more than the axial displacement of toothed portion 18 per revolution. As a result, during oncoming spiral motions toothed portion 16 pushes toothed portion 18 along parting plane "A". During separate spiral motions toothed portion 16 pulls toothed portion 18 by rings 30 and pins 28. As a result, by the axial displacement toothed portion 16 pushes or pulls toothed portion 18. Teeth 50 of gear 12 will mesh with teeth 52 of gear 14. Teeth 50 of gear 12 will intermesh with teeth 54 of gear 14 along the opposite tooth flanks. As illustrated in FIGS. 4 and 4A and 5 and 5A spiral joints 22 and 24 comprise outer spiral sections 13 and 15 of hub 20, inner spirals 17 and 19 of the toothed portions 16 and 18, respectively and balls 11. Balls 11 are kept in grooves of the spiral joints 22 and 24 by cylindrical surfaces 25 and parting plane "A".

The spiral joints 22 and 24 are overhauling. The following equation (a) shows that the spiral joints 22 and 24 are overhauling:

$$d_m \left( \frac{f_r \prod d_m - L}{\prod d_m + f_r L} \right) + f_c d_c < 0 \quad \text{(a)}$$

Where:

$d_m$—diameter of contact in the spiral joints 22 and 24

$f_r$—coefficient of rolling friction in the spiral joints 22 and $f_c$—coefficient of friction between the toothed portions $d_c$—average diameter of contact between the toothed portions L—lead of thread $$d_c \approx 1.2 d_m \quad \text{(b)}$$

after substituting (b) into (a) and simplifying with little error $$f_r + 1.2 f_c < \frac{L}{\prod d_m} \quad \text{(c)}$$

$$tg\lambda = \frac{L}{\prod d_m} \quad \text{(d)}$$

where $\lambda$—lead angle after substituting (d) into (c)

$$f_r + 1.2 f_c < tg\lambda \quad \text{(e)}$$

In FIGS. 4 and 4A, and 5 and 5A and FIG. 3A an arrow 56 indicates of the direction of rotation of gear 14 Arrows 58 and 60 and 62 indicate the reactionary axial forces $W_{58}$ and $W_{60}$ and the reactionary tangential forces $Q_{62}$ and $Q_{64}$ respectively effective in points of contact surfaces of spirals 17 and 19 with balls 11. In FIGS. 4 and 4A arrows 59 and 61 indicate components of an applied force in view of the peripheral forces $F_{n1}$ and $F_{n2}$ effective on teeth 52 and 54 respectively. In FIGS. 5 and 5A A arrow 63 indicates an applied force $F_n$ effective on teeth 52. Arrow 65 indicates reactionary peripheral force $F_r$ effective on flanks of teeth 54 opposite working flanks. For the sake of a better representation, these forces are respectively indicated by an arrow in the center of the respective tooth width. The axial force W is calculated accordingly to the following equation (f):

$$W = F_n d_1 \frac{1}{\left[d_m\left(\frac{f_r \prod d_{nr} + L\cos\alpha_n}{\prod d_m \cos\alpha_n \mp f_r L}\right) + f_c d_c\right]} \quad (f)$$

where:

$F_n$—peripheral force
$d_1$—diameter of pitch circle
$\alpha_n$—thread angle after simplifying with little error $\cos \alpha_n = 1$ $$W = F_n d_1 \frac{1}{\left[d_m\left(\frac{f_m \prod d_m + L}{\prod d_m \mp f_r L}\right) + f_c d_c\right]} \quad (g)$$

The tangential force Q is calculate accordingly to the following equation (h)

$$Q = W\left(\frac{f_r \pm \frac{L}{\prod d_m}}{1 \mp \frac{f_r L}{\prod d_m}}\right) \quad (h)$$

FIG. 1, shows gear assembly 70 for the transmission between two intersecting shafts, one of which is the drive shaft 80 and the other is the driven shaft 32. Gear assembly 70 comprises of first and second meshing bevel gears 72 and 74. Gear 72 is fixedly mounted to shafts 80. Gear 74 is formed of coaxially disposed spiral floating toothed portions 76 and 78. Toothed portions 76 and 78 mounted to driven shaft 32 interact with it by spiral joints 22 and 24 in opposite directions. In this case the arresting device is the retaining ring mounted to drive shaft 32 and contacting with one of the toothed portions. The retaining ring is not shown. Such design of the arresting device can be used for transmission where an applied force of the reverse rotation is transmitted by one toothed portion only. Driven shaft 32 is a component of gear 74. The mounting and the operation of the bevel gearing are the same as the gearing with the parallel shafts therefor the mounting and operation of the bevel gearing are not described.

Operation—FIGS. 1 to 5

Referring now to FIGS. 4 and 4A wherein spiral joints 22 and 24 of the toothed portions may be in the opposite direction, teeth 48 and 50 of gear 12 may engage with teeth 52 and 54 of toothed portions 16 and 18 of gear 14, respectively. Arrow 56 indicates the direction of the rotation of gear 14 by the action of an applied force. The applied force is distributed between toothed portions 16 and 18 in view peripheral forces 59 and 61 in proportion to the relationship between the tangents of lead angles $\lambda_1$ and $\lambda_2$ of spiral joints 22 and 24. Under the action of peripheral forces 59 and 61 surfaces 17 and 19 of the spiral joints 22 and 24 contact with balls 11, and balls 11 contact with surfaces of spiral sections 13 and 15, respectively. As a result, axial forces 58 and 60 and the tangential forces 62 and 64 are generated in spiral joints 22 and 24 at their contacting surfaces 17 and 19. The forces 58 and 60 are the reason for contact between toothed portions 16 and 18 along the parting plane "A". Forces 62 and 64 are the reason for the rotation in the opposite direction of the toothed portions relative to each other. Forces 62 and 64 are also the reason for the engagement of teeth 52 and 54 of toothed portions 16 and 18 with teeth 48 and 50 of gear 12, respectively. The resultant of the forces 58 and 60, 59 and 62, and 61 and 64, respectively, must be equal zero. Clearance in the gear mesh and the spiral joints 22 and 24 are equal to zero. The indicated above forces are in equilibrium. Toothed portions 16 and 18 transmit the applied force.

Supposing one of teeth 52 or 54 of toothed portions 16 or 18 have a backlash with teeth 48 or 50 of gear 12, respectively. The forces would not be in equilibrium. The teeth 52 or 54 of the toothed portion 16 or 18 which engage with the teeth 48 or 50 of gear 12 may have a conditional name "first toothed portion". The teeth 52 or 54 of the toothed portion 16 or 18 which may have the backlash with the teeth of gear 12 has the conditional name "second toothed portion". As a result, by the action of the applied force, the "first toothed portion" makes a spiral motion relative to hub 20. At the same time, the "first toothed portion" pushes the "second toothed portion" which makes a spiral motion relative to component 20. The pushing force of the "first toothed portion" pushing the "second toothed portion" is equal to the axial force W and acts at the parting plane "A". The toothed portions 16 or 18 are stopped after the engagement of the teeth 52 or 54 of the "second toothed portion" with the teeth 48 or 50 of gear 12. Now the gearing may work as illustrated in FIG. 4.

Referring now to FIG. 4A, arrow 56 indicates the reverse direction of the rotation of the gear 14 by the action of the applied force. All forces 59 and 61, 58 and 60, and 62 and 64 have the opposite direction relative to forces 59 and 61, 58 and 60, and 62 and 64 as illustrated in FIG. 4A, respectively. Forces 58 and 60 urge the toothed portions 16 or 18 to separate motions. As a result, toothed portions 16 and 18 contact with retaining rings 30 of arresting device 26 along their contacting surfaces "B" and "C". Retaining rings 30 and pins 28 hold together the toothed portions in the axial direction. In this case, if the forces are not in equilibrium, the "first toothed portion pulls the "second toothed portion". The operation of the spiral joints 22 and 24 is the same as FIG. 4.

Referring now to FIG. 5 wherein spiral joints 22 and 24 of the toothed portions may be in the same direction but have different lead angles $\lambda_1$ and $\lambda_2$ such that $\lambda_1 > \lambda_2$, teeth 48 of gear 12 engage with teeth 52 of toothed portion 16. Teeth 50 of gear 12 engage with teeth 54 of toothed portion 18 along the flanks opposite working flanks with respect to each other. Accordingly, free angular displacement of gear 12 and gear 14 within any backlash are prevented and the possibility of hammering is eliminated. Arrow 56 indicates the direction of the rotation of gears 14 by the action of the applied force 63. Under the action of applied force 63 and reactionary peripheral force 65, surfaces of spirals 17 and 19 contact with balls 11 and balls 11 contact with surfaces of spiral sections 13 and 15, respectively. As a result, the axial forces 58 and 60 and the tangential forces 62 and 64 are generated in spiral joints 22 and 24 at their contacting surfaces 17 and 19. Forces 58 and 60 are the reason for contact between toothed portions 16 and 18 along the parting plane "A". Forces 62 and 64 are the reason for the rotation of the toothed portions relative to each other in the same direction. Force 62 is the reason for the engagement of teeth 48 of gear 12 with teeth 54 of gear 14 along the flanks opposite working flanks with respect to each other. Force 62 is also the reason for the generation of the reaction peripheral force 65. The resultant of forces 58 and 60, 62 and 63, 64 and 65 must be equal to zero. Clearance in the gear mesh and the spiral joints 22 and 24 are equal to zero. The indicated above forces are in equilibrium. Toothed portions 16, wherein toothed portion 18 provides zero backlash, transmits the applied force.

Supposing teeth 54 of toothed portion 18 has a backlash with teeth 50 of gear 12. The forces indicated above are not in equilibrium. As a result, by the action of the applied force, toothed portion 16 makes a spiral motion relative to hub 20. At the same time, the applied force pushes toothed portion 18 which makes a spiral motion relative to hub 20. The pushing force is equal to the axial force W and acts at the parting plane "A". The spiral motions of toothed portion 16 and, consequently, of toothed portion 18 are stopped after of the engagement of the teeth of toothed portion 18 with the teeth of gear 12 along flanks opposite working flanks. Now the gearing is working as illustrate in FIG. 5.

Referring now to FIG. 5A, arrow 56 indicates the direction of the rotation of gear 14 by the action of the applied force 63. All forces 63 and 65, 58 and 60, and 62 and 64 have the opposite direction relative to forces 63 and 65, 58 and 60, and 62 and 64 as illustrated in FIG. 5. Forces 58 and 60 urge the toothed portions 16 and 18 to separate motions. As a result, toothed portions 16 and 18 contact with retaining rings 30 of arresting device 26 along their contacting surfaces "B" and "C". Retaining rings 30 and pins 28 hold together the toothed portions 16 and 18 in the axial direction. In this case, toothed portion 16 pulls toothed portion 18 if the forces are not equilibrium. The operation of spiral joints 22 and 24 as describe above and illustrated in FIG. 5 is similarly illustrated in FIG. 3. The embodiment of the present invention, as generally illustrated in FIGS. 4 and 4A is also generally illustrated in FIGS. 5 and 5A with minimal differences. A difference between the FIGS. 4 and 4A and 5 and 5A is that the spiral joints 24 and 25 of FIGS. 4 and 4A are illustrated in the opposite direction and spiral joints 24 and 25 of FIGS. 5 and 5A are illustrated in the same direction but with different lead angles $\lambda_1$ and $\lambda_2$. The embodiment of the gearing shown in FIGS. 4 and 4A is intended for use in a transmission with high output torques. The weight of the transmission will increase insignificantly. The embodiment of the gearing shown in FIGS. 5 and 5A is intended for use in transmission with zero backlashes.

Figure 6:
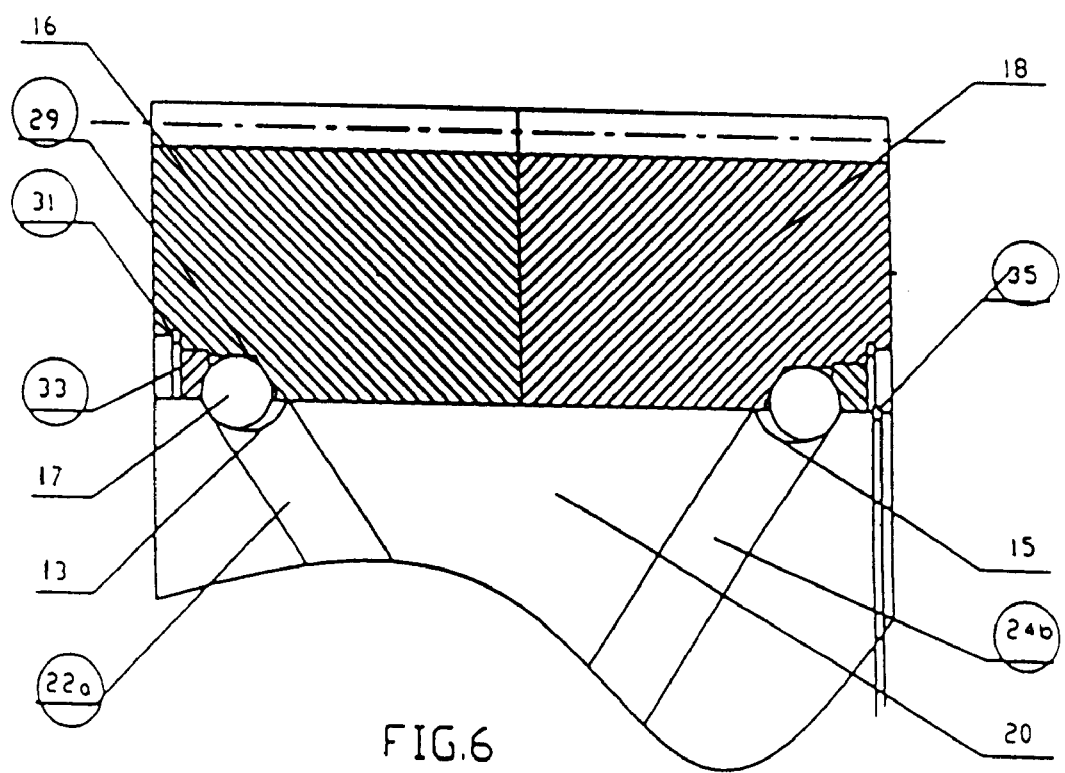
FIG. 6 is a diagrammatic illustration of the spiral joints of the gear assembly 10 of FIG. 1.

As illustrated in FIG. 6, in an embodiment of the present invention, spiral joints 22a and 24b each have a spiral section 13 and 15, respectively. The spiral joints 22a and 24b each further have one ball 17. Toothed portions 16 and 18 are constructed in the form of half blind holes 29. Each ball 17 is secured in a hole 29 by cap 33 and retaining ring 31

Conclusion, Ramification and Scope

Accordingly the reader will see that the gearing with duplex floating toothed portions of this invention for the transmission can be used:

1) to provide even distribution of applied load between the toothed portions for increasing loading ability of a typical gearing without increasing of a center distance, but with increasing of effective face width of the gears. The weight of the gear assembly will increase insignificantly. Service life of the gearing with increased load will stay the same.

2) to provide synchronous rotation of the toothed portions for transmission of a torque, such as, for example, in a double-reduction worm gear unit by two independent worms.

3) for high-speed gearing to eliminate dynamic loading on the gear teeth without the use of the toothed portions having different helix angles and preloading means.

Furthermore, such invention has the additional advantage in that, it can be used in a reversible multi-stage transmission of any specification, for example, planetary gear train, wherein driving reaction or driven gear may be made as gear with the floating toothed portions.

Although the description above contains many specificities these should not be construed as limiting the scope of the invention but as merely providing illustrations of some of the presently preferred embodiments of this invention. For example, the gear with the floating toothed portions may be made as a double spiral bevel gear. The gear may be coupled with its shaft by a coupling, the arrangement of the spiral joints 24 and 25 may have other designs, etc.

Thus the scope of the invention should be determined by the appended claims and their legal equivalents, rather than by examples given.

Further, it should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A torque-increasing gearing system for transmission between a drive shaft and a driven shaft, the system comprising:

a first meshing gear and a second meshing gear each having teeth wherein the teeth form a mating relationship between the first meshing gear and the second meshing gear; and a hub connected to the first meshing gear and the second meshing gear wherein the hub is integrally formed with one of said shafts wherein the drive shaft and the driven shaft establish a driving relationship and further wherein the second meshing gear is mounted to said shaft and axially displaced from the first meshing gear wherein spiral motion is created along the hub of said shaft.

2. The system of claim 1 further comprising:

a preloading means engaging the first meshing gear for applying a load to the first meshing gear to urge the first meshing gear against the second meshing gear.

3. The system of claim 1 further comprising:

an arresting device having retaining rings disposed on pins contacting the first meshing gear and teeth of the second meshing gear.

4. The system of claim 1 further comprising:

a hole formed at least one of said meshing gears wherein a spiral is attached to the first meshing gear and the second meshing gear at each of the holes.

5. The system of claim 4 wherein the spiral is formed from a single ball.

6. The system of claim 1 wherein the first meshing gear and the second meshing gear are spurs.

7. The system of claim 1 wherein the first meshing gear and the second meshing gear are helical.

* * * * *